United States Patent [19]
Boelkins

[11] 3,799,589
[45] Mar. 26, 1974

[54] SWIVEL COUPLING FOR FLUID CONDUITS

[75] Inventor: Wallace G. Boelkins, Grand Rapids, Mich.

[73] Assignee: Uni-Mist, Inc., Grand Rapids, Mich.

[22] Filed: Jan. 21, 1972

[21] Appl. No.: 219,695

[52] U.S. Cl............................ 285/281, 285/321
[51] Int. Cl............................................ F16l 27/00
[58] Field of Search............ 285/276, 281, 321, 98, 285/190

[56] References Cited
UNITED STATES PATENTS

| | | | |
|---|---|---|---|
| 3,532,364 | 10/1970 | Snyder | 285/98 |
| 2,270,928 | 1/1942 | Browne | 285/276 |
| 2,599,935 | 6/1952 | Pasker | 285/276 X |
| 2,653,041 | 9/1953 | Wilson | 285/276 X |
| 3,363,919 | 1/1968 | Brazell | 285/276 |

Primary Examiner—Dave W. Arola
Attorney, Agent, or Firm—Price, Heneveld, Huizenga & Cooper

[57] ABSTRACT

A swivel coupling having a male member with a stem inserted through a closely fitting mating passage of a female member includes an annular channel in the female member, interrupting the surface of the mating passage. An O-ring seal is disposed within the annular channel. The mating passage also has an interior enlargement into which the stem projects. Bearings and bearing washers are disposed around the stem within the interior enlargement. The bearings and bearing washers are held in place by a snap ring which snaps into an indexing groove on the stem of the male member. The stem of the male member projects forwardly from a shoulder which limits the extent to which the stem can be inserted into the female member.

7 Claims, 4 Drawing Figures

PATENTED MAR 26 1974  3,799,589

SWIVEL COUPLING FOR FLUID CONDUITS

BACKGROUND OF THE INVENTION

The present invention relates to couplings for fluid carrying conduits, such as hoses. In particular, it relates to swivel couplings which allow one coupled conduit member to swivel with respect to the other.

Generally, such swivel couplings have mating male and female members with seals disposed therebetween, and some may have bearings. A stem on the male member projects through a passage in the female member and into an interior passage of larger diameter than the mating passage. In the interior passage, the stem is surrounded by the bearings and seals, all of which are held in place by one manner or another of holding member, often mounted on the stem. For example, threaded members are often used which can be tightened to enhance the effectiveness of the seal or loosened to facilitate easier swivelling; thus, such arrangements are based upon a compromise of these two desired aspects and as a result frequently provide less than desirable sealing and swivelling operation.

A significant problem encountered with such couplings is also that the sealing means are placed under considerable wear strain and generally do not last as long as would be desirable. Also, under increased pressures many such couplings will no longer swivel, or do so only with great resistance. Basically this results from the fact that as the pressure of fluid flowing through the coupling tends to separate the male and female members. The sealing means are placed in excessive compression between the holding means on the stem end and the end wall of the interior passage at the junction between the interior passage and the mating passage. This compressive force increases the friction of swiveling and increases the wear on the sealing means.

It also frequently happens that the bearing means, being located directly adjacent the sealing means, tends to increase the wear on the seals. As one of the coupling members is swiveled with respect to the other, the bearing means may tend to rub against the seals. Thus, it is clear that the seals in such couplings do not last as long as would be desirable, and in fact many exhibit leakage almost immediately.

An additional drawback encountered with such couplings is the tendency towards a sloppy fit between the male and female members. This allows the male and female members to slide axially with respect to one another and thereby further increases the frictional wear on the sealing means.

Attempts have heretofore been made to isolate the seals from such forces of compression and from the bearing means. However, such attempts have not been markedly successful and have not afforded the needed solution to the underlying successful and have not afforded the need solution to the underlying problem; indeed, at times they introduce problems of their own. For example, the construction shown in U. S. Pat. No. 2,655,391, is exemplary of such an attempt. In this device the primary seal or packing, P, and a secondary seal 54 are separated from the bearing means. However, such separation is accomplished only through a very cumbersome arrangement of three distinct members plus a holding means. This is in contrast to the conventionally-used couple which has only two parts, i.e., the male and female members. Accordingly, the expense of manufacturing a coupling of this nature is overly burdensome.

SUMMARY OF THE INVENTION

In contrast, the present invention solves the problems referred to above in a manner which is effective and which facilitates simplified and inexpensive manufacturing of the swivel coupling. In the present invention, the surface of the mating passage is interrupted by an annular channel in the female member. The sealing means is disposed within this channel. The stem, projecting through the mating passage into an interior passage of larger diameter, is surrounded in the interior passage by bearing means by an integral, structural or load-carrying annular flange therebetween. The pressure of separation of the male and female members is exerted on the bearing means only, and is not transmitted to the sealing means. Yet, this result is achieved with a structure which can be inexpensively manufactured.

In another aspect of this invention, the stem projects from a shoulder on the male member. This shoulder limits the extent to which the male member can be inserted into the female member. Thus, the shoulder acts in combination with the holding means on the stem of the male member to limit the extent to which the male and female members can slide axially with respect to one another. This further minimizes frictional wear on the sealing means.

In an important aspect of this invention, the holding means cooperates with an indexing means on the stem. This indexing means positively locates the point at which the holding means joins the stem and thereby positively fixes its location. This prevents adjustment problems which would arise if the holding means could be adjusted to a plurality of positions along the length of the stem. These problems would include, for example, placing too much compression on the bearing means and thereby making the coupling swivel only with great difficulty. In the alternative, a setting might be selected which is too loose, thereby permitting too much axial sliding of the male and female members, resulting in undesirable wear on the sealing means.

These and other aspects and objects of the invention will be further appreciated by reference to the written specification and appended drawings.

PREFERRED EMBODIMENT

Figure 1:
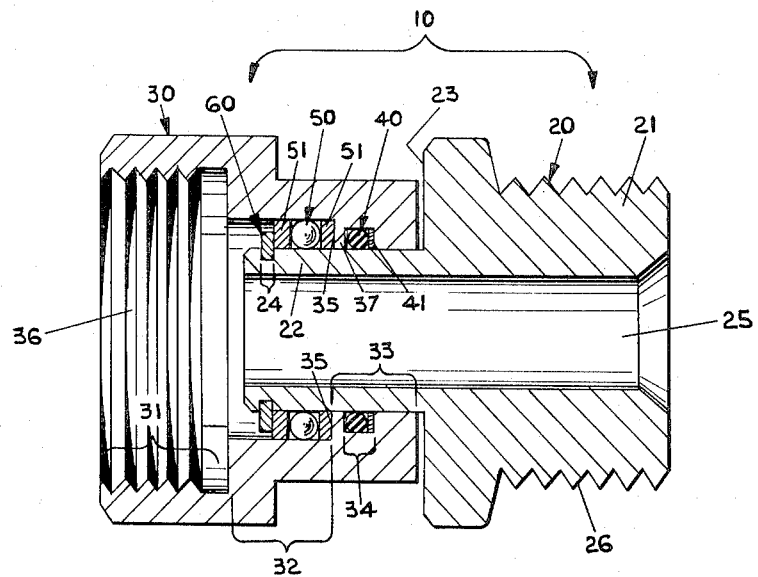
FIG. 1 is a central cross-sectional view of the assembled swivel coupling.

In the preferred embodiment, the swivel coupling 10 includes a male member 20 having a stem 22 projecting through a closely fitting mating passage 33 of female member 30 (FIG. 1). The interior surface of mating passage 33 is interrupted by an annular channel 34 in female member 30. A sealing means including an O-ring 40 is disposed therein. Mating passage 33 communicates with an interior passage 32 of larger diameter. Stem 22 projects into interior passage 32 and is surrounded therein by ball bearings 50. A snap ring 60 which seats in a groove 24 on the end of stem 22 holds bearings 50 in place and, at the same time, holds male member 20 and female member 30 together.

Figure 3:
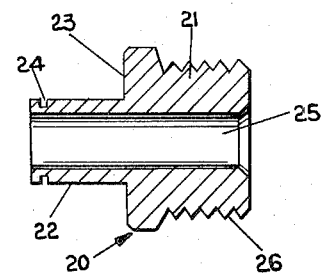
FIG. 3 is a cross-sectional view of the male member.

Male member 20 is constructed of brass or other suitable material by machining or other equivalent manufacturing process. It includes a body 21 with a stem 22 projecting forwardly there-from (FIG. 3). The junction of body 21 and stem 22 defines a shoulder 23 which limits the extent to which stem 22 can be inserted into female member 30 (FIGS. 1 and 3). Stem 22 includes an indexing groove 24 extending circumferentially therearound. Indexing groove 24 cooperates with snap ring 60 to positively locate the same near the end of stem 22.

Fluid flows through male member 20 by means of a passage 25 extending axially therethrough. Male member 20 is secured to a fluid carrying hose or pipe by means of threads 26 disposed on the exterior of body 21.

Figure 2:
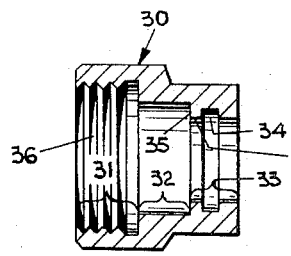
FIG. 2 is a cross-sectional view of the female member.

Female member 30 is made of a material similar to that which male member 20 is made and is made in a similar fashion. Female member 30 includes a mating passage 33 extending from one end thereof inwardly (FIG. 2). Mating passage 33 has an inside diameter, which is only very slightly less than the outside diameter of stem 22 to provide a close fit therebetween.

Mating passage 33 communicates with an interior passage 32 of larger diameter. The junction between the two passages defines an interior shoulder 35 which carries lateral loading through the bearings 50. Interior passage 32, in turn, commu-nicates with an entrance port 31 at the end of female member 30 opposite mating passage 33. Port 31 is of slightly larger diameter than interior passage 32 and includes threads 36 on the interior surface thereof whereby female member 30 can be joined to a fluid carrying conduit.

The interior surface of mating passage 33 is interrupted by an annular channel 34 (FIG. 2). In effect, annular channel 34 forms, and is separated from interior passage 32 by, an interior annular flange 37, which projects radially inwardly from the cylindrical wall of female member 30 and whose inner cylindrical and surface defines a portion of mating passage 33. It is annular flange 37 which physically separates O-ring seal 40 from bearings 50 (FIG. 1).

O-ring 40 is a conventional resilient rubber or polymeric 0-ring. To facilitate sealing, a small spacer washer 41, preferably in the form of a split spiral packing of polytetrafluoroethylene or the like, is positioned within channel 34 adjacent O-ring 40 (FIG. 1).

Bearings 50 are conventional ball bearings of any suitable material. They are flanked on either side by disc-like washers 51 which form lateral bearing races and are a part of the bearing structure.

Snap ring 60 is also a basically conventional element in other apparatus, although not heretofore known in a structure of the present type. It cooperates with stem 22 by snapping into indexing groove 24 therein. This provides a positively located holding means and eliminates the need for guesswork or adjustment in positioning the holding means.

Thus, stem 22 of male member 20 extends through mating passage 33 and projects into interior passage 32. O-ring 40 and its spacer washer 41 are positioned about stem 22, within annular channel 34. Bearings 50 and washers 51 are disposed about stem 22 within interior passage 32, where they are held in place against shoulder 35 by means of snap ring 60 sealed in groove 24 of stem 22. Shoulder 23 on male member 20 limits the extent to which stem 22 can be inserted into female member 30. Shoulder 23 cooperates with snap ring 60 to limit the extent to which male member 20 and female member 30 can slide axially with respect to one another.

In operation, one fluid carrying conduit member is threaded onto threads 26 of male member 20 while the other fluid carrying member is threaded into the threads 36 of port 31 of female member 30. Fluid passage through passage 25, interior passage 32 and port 31 tends to force male member 20 and female member 30 axially apart. However, snap ring 60 positively prevents the members from separating, and maintains their normal spacing, by acting against washers 51 and bearing 50, forcing them against the interior shoulder 35.

Sealing O-ring 40 and its back-up spacer ring 41 prevent fluid from escaping between the two elements of coupling 10. However, the sealing means is insulated from the axial forces of compression acting on the bearing assembly by being disposed within separate and distinct annular channel 34. Similarly, the seal is physically separated from bearings 50 and washers 51 by means of annular flange 37 projecting radially inwardly from the interior cylinder-defining wall of female member 30.

Figure 4:
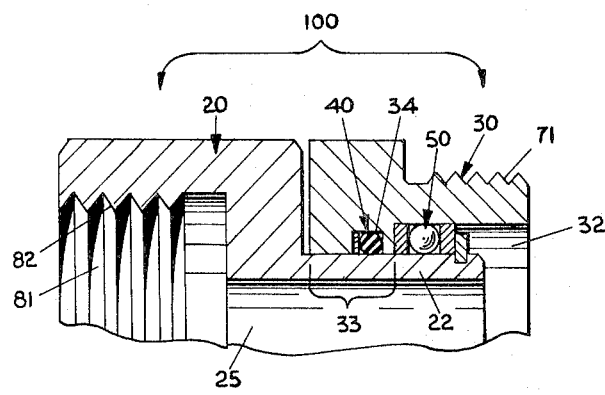
FIG. 4 is a cross-sectional, fragmentary view of an alternative embodiment of the swivel coupling.

In the alternative embodiment illustrated in FIG. 4, swivel coupling 100 has a basic arrangement of the sealing means 40 and bearing means 50 which is identical to that discussed above. Male member 20 includes a stem 22 and female member 30 includes a mating passage 33, an annular channel 34 and an interior passage 32. Similarly, male member 20 includes a passage 25 extending through stem 22.

However, interior passage 32 of female member 30 extends directly to the end thereof, and does not join with any threaded port passage. Rather than providing threads on the interior of a port passage, the female member 30 of swivel coupling 100 provides threads 71 on the exterior surface thereof.

On the other hand, male member 20 does include a port passage 81 which communicates with passage 25, and port passage 81 includes threads 82 on the interior surface thereof. Thus, swivel coupling 100 demonstrates the manner in which this invention can be implemented in a manner such that the male and female coupling members can be used either with interior or exterior threads.

Naturally, it will be understood that the above are merely preferred embodiments of the invention and that various additional modifications nad variations can be made thereof without departing from the spirit and broader aspects of the invention. Consequently, all such changed embodiments or variations in structure which utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. A two-piece swivel coupling comprising: a male member formed of one piece, with a stem having a free end; a female member formed of one piece and defining an end opening through which said stem is disposed; a sealing means and bearing means positioned between the exterior surface of said stem and an interior generally cylindrical wall of said female member extending inwardly thereof from, and communicating with, said end opening; an interior annular flange projecting radially inwardly from said interior wall of said female member and separating said sealing means from said bearing means; said bearing means being located on that side of said flange closest to the free end of said stem; said annular flange defining an interior shoulder against which said bearing means is held; holding means detachably mounted on said stem near the free end thereof for holding said bearing means against said interior shoulder; said female member having an enlarged open end opposite from said end opening thereof, extending from said interior generally cylindrical wall thereof, said enlarged open end being sufficiently large to provide access therethrough to the free end of said stem for installation and removal of said holding means therefrom.

2. The swivel coupling of claim 1 in which: said male member includes a shoulder means, from which said stem projects, for limiting the extent to which said stem can be inserted into said female member.

3. The swivel coupling of claim 2 in which said stem includes indexing means positioned at a given point along its length, said indexing means cooperating with said holding means to positively locate said holding means on said stem.

4. The swivel coupling of claim 3 in which said indexing means comprises a groove extending circumferentially about said stem and in which said holding means comprises a snap ring for insertion into said groove.

5. The swivel coupling of claim 1 in which said stem includes indexing means positioned at a given point along its length, said indexing means cooperating with said holding means to positively locate said holding means on said stem.

6. The swivel coupling of claim 5 in which said indexing means comprises a groove extending circumferentially about said stem and in which said holding means comprises a snap ring for insertion into said groove.

7. The swivel coupling of claim 1 in which said sealing means is the primary seal between said male and female members.

* * * * *